(12) United States Patent
Parenti et al.

(10) Patent No.: US 9,870,296 B1
(45) Date of Patent: Jan. 16, 2018

(54) EVALUATING SYSTEM PERFORMANCE

(76) Inventors: Mark A. Parenti, Milford, NH (US); Stephen J. Todd, Shrewsbury, MA (US); Timothy J. Cox, Mendon, MA (US)

( * ) Notice: Subject to any disclaimer, the term of this patent is extended or adjusted under 35 U.S.C. 154(b) by 371 days.

(21) Appl. No.: 13/163,019

(22) Filed: Jun. 17, 2011

(51) Int. Cl.
G06F 11/34 (2006.01)

(52) U.S. Cl.
CPC .......... G06F 11/3409 (2013.01); G06F 11/34 (2013.01); G06F 11/3466 (2013.01); G06F 11/3495 (2013.01); *G06F 2201/86* (2013.01); *G06F 2201/865* (2013.01)

(58) Field of Classification Search
CPC .......... G06F 3/04; G06F 3/06; G06F 2201/86; G06F 2201/865; G06F 11/34; G06F 11/3409; G06F 11/3466; G06F 11/3495
See application file for complete search history.

(56) References Cited

U.S. PATENT DOCUMENTS

| | | | |
|---|---|---|---|
| 5,105,372 A * | 4/1992 | Provost et al. | 702/185 |
| 5,689,708 A * | 11/1997 | Regnier et al. | 709/229 |
| 6,126,329 A * | 10/2000 | Bennett et al. | 717/127 |
| 6,188,992 B1 * | 2/2001 | French | 705/36 R |
| 6,356,256 B1 * | 3/2002 | Leftwich | 345/157 |
| 6,473,407 B1 * | 10/2002 | Ditmer et al. | 370/252 |
| 6,622,221 B1 * | 9/2003 | Zahavi | 711/154 |
| 6,707,454 B1 * | 3/2004 | Barg | G06F 17/246 345/440 |
| 6,772,375 B1 * | 8/2004 | Banga | 714/47.2 |
| 6,898,556 B2 * | 5/2005 | Smocha et al. | 702/186 |
| 6,975,963 B2 * | 12/2005 | Hamilton et al. | 702/182 |
| 7,134,093 B2 * | 11/2006 | Etgen et al. | 715/786 |
| 7,348,981 B1 * | 3/2008 | Buck | 345/440.2 |
| 7,849,263 B1 * | 12/2010 | French | G06F 3/0608 711/114 |
| 8,015,454 B1 * | 9/2011 | Harrison | G06F 11/3409 714/47.3 |
| 8,024,542 B1 * | 9/2011 | Chatterjee | G06F 9/5083 711/154 |
| 8,099,674 B2 * | 1/2012 | Mackinlay et al. | 715/764 |
| 8,209,218 B1 * | 6/2012 | Basu et al. | 705/7.39 |
| 8,386,301 B2 * | 2/2013 | Rajasingham | 705/7.38 |
| 8,566,736 B1 * | 10/2013 | Jacob | G06T 13/20 715/764 |

(Continued)

OTHER PUBLICATIONS

"Website Traffic Analysis Engine and User Interface," U.S. Appl. No. 60/688,076, by Catherine Wong, Brett Error, Chris Error, and Josh Ezro, filed Jun. 6, 2005.*

(Continued)

*Primary Examiner* — Ryan Barrett
(74) *Attorney, Agent, or Firm* — Krishnendu Gupta; Jason A. Reyes

(57) ABSTRACT

A method and system for use in evaluating system performance is disclosed. In at least one embodiment, the method and system comprises collecting system performance, management operations, and system events data for a computer system; correlating the management operations and the system events data with the performance data; and based on the correlation, providing a graphical user interface for enabling performance evaluations of the computer system by graphically displaying the management operations and the system events data overlaying the performance data.

12 Claims, 3 Drawing Sheets

(56) References Cited

U.S. PATENT DOCUMENTS

| | | | | |
|---|---|---|---|---|
| 8,667,385 B1* | 3/2014 | Mui | ...................... | G06F 17/241 |
| | | | | 715/205 |
| 9,336,340 B1* | 5/2016 | Dong | ........................ | G06F 17/50 |
| 2003/0071814 A1* | 4/2003 | Jou | ........................ | G06F 9/542 |
| | | | | 345/440 |
| 2004/0015579 A1* | 1/2004 | Cooper et al. | ................. | 709/223 |
| 2004/0041838 A1* | 3/2004 | Adusumilli et al. | .......... | 345/772 |
| 2004/0095349 A1* | 5/2004 | Bito | ...................... | G06K 9/6253 |
| | | | | 345/440 |
| 2005/0065756 A1* | 3/2005 | Hanaman et al. | ................ | 703/2 |
| 2006/0189330 A1* | 8/2006 | Nelson et al. | ................ | 455/457 |
| 2006/0277087 A1* | 12/2006 | Error | ................................. | 705/8 |
| 2006/0277197 A1* | 12/2006 | Bailey | ............................ | 707/10 |
| 2007/0043861 A1* | 2/2007 | Baron et al. | .................. | 709/224 |
| 2007/0061450 A1* | 3/2007 | Burnley et al. | ................ | 709/224 |
| 2007/0230682 A1* | 10/2007 | Meghan et al. | .......... | 379/265.06 |
| 2008/0091669 A1* | 4/2008 | Anderson et al. | ................ | 707/5 |
| 2008/0244453 A1* | 10/2008 | Cafer | .................. | G06F 3/04817 |
| | | | | 715/835 |
| 2009/0024979 A1* | 1/2009 | Chessell et al. | .............. | 717/104 |
| 2009/0172272 A1* | 7/2009 | Yamane et al. | ................ | 711/112 |
| 2009/0300544 A1* | 12/2009 | Psenka et al. | ................. | 715/810 |
| 2010/0114493 A1* | 5/2010 | Vestal | ................................ | 702/9 |
| 2010/0121707 A1* | 5/2010 | Goeldi | ................... | G06Q 10/00 |
| | | | | 705/14.49 |
| 2010/0274531 A1* | 10/2010 | Bondi | ................. | G06F 11/3612 |
| | | | | 702/186 |
| 2010/0274599 A1* | 10/2010 | DeRoller | ........................... | 705/7 |
| 2011/0029853 A1* | 2/2011 | Garrity et al. | ................. | 715/215 |
| 2011/0167433 A1* | 7/2011 | Appelbaum et al. | ......... | 719/318 |
| 2011/0173342 A1* | 7/2011 | Cooper et al. | ................. | 709/233 |
| 2011/0185280 A1* | 7/2011 | Nakash et al. | ................ | 715/736 |
| 2011/0197122 A1* | 8/2011 | Chan et al. | ................... | 715/234 |
| 2011/0208564 A1* | 8/2011 | Ballow et al. | ............... | 705/7.36 |
| 2011/0252214 A1* | 10/2011 | Naganuma et al. | ........... | 711/170 |
| 2012/0023429 A1* | 1/2012 | Medhi | ............................ | 715/772 |
| 2013/0097662 A1* | 4/2013 | Pearcy et al. | ..................... | 726/1 |

OTHER PUBLICATIONS

Infragistics, "Telling a Good Story with Interactive Line Charts," Feb. 2, 2010, http://www.infragistics.com/community/blogs/ux/archive/2010/02/02/telling-a-good-story-with-interactive-line-charts.aspx.*

Lee et al., "Load testing Web applications using IBM Rational Performance Tester: Part 4. Test results analysis reports," Sep. 14, 2007, http://www.ibm.com/developerworks/rational/library/09/loadtestwebapps_part4/loadtestwebapps_part4-pdf.pdf.*

* cited by examiner

EVALUATING SYSTEM PERFORMANCE

BACKGROUND

1. Field of the Invention

The present invention relates to evaluating system performance.

2. Description of Prior Art

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to the increased need for storage by integrating high capacity data storage systems, data communications devices (e.g., switches), and computer systems (e.g., host computers or servers) into so-called "storage networks" or "Storage Area Networks" (SANs.)

In general, a storage area network is a collection of data storage systems that are networked together via a switching fabric to a number of host computer systems operating as servers. The host computers access data stored in the data storage systems (of a respective storage area network) on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support hi-speed acquisitions of data so that the host servers are able to promptly retrieve and store data from the data storage system.

Today's computer systems can be complex. Effectively evaluating the performance of computer systems, including data storage systems, helps ensure acceptable performance of these complex systems. Towards this goal, many tools have been developed to monitor system resources, system performance, and application performance. For example, a tool may be used to determine the cause of a bottleneck or performance issue.

SUMMARY OF THE INVENTION

A method and system for use in evaluating system performance is disclosed. In at least one embodiment, the method and system comprises collecting system performance, management operations, and system events data for a computer system; correlating the management operations and the system events data with the performance data; and based on the correlation, providing a graphical user interface for enabling performance evaluations of the computer system by graphically displaying the management operations and the system events data overlaying the performance data.

BRIEF DESCRIPTION OF THE DRAWINGS

Features and advantages of the present invention will become more apparent from the following detailed description of exemplary embodiments thereof taken in conjunction with the accompanying drawings in which.

DESCRIPTION OF EMBODIMENT(S)

Described below is a technique for use in evaluating system performance. In at least one embodiment of the technique, the technique helps correlate management operations and system events with system performance using a graphical user interface. The correlation may help a user improve system performance in various ways. For example, the correlation may enable a user to more easily pinpoint causes of system bottlenecks and errors, and drive future user behavior that results in improved system performance.

Figure 1:
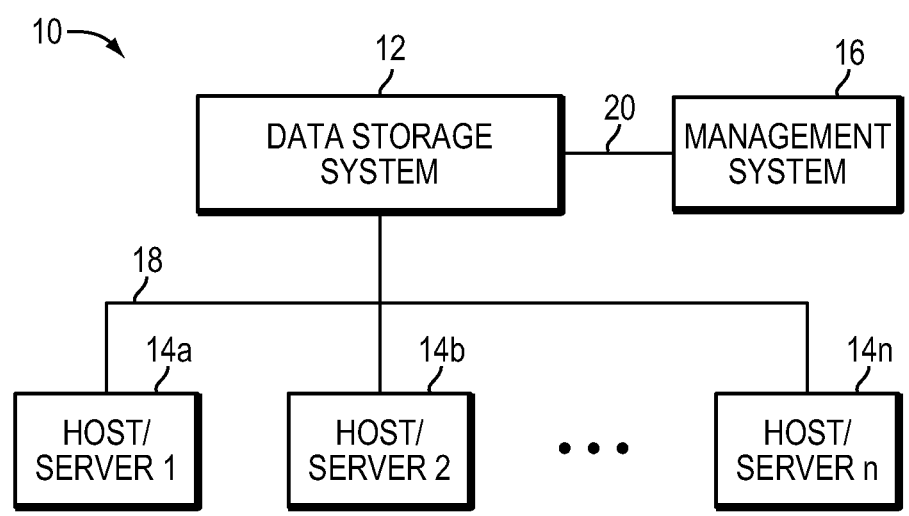
FIG. 1 illustrates an example system that may be used with the technique herein.

Referring now to FIG. 1, shown is an example of an embodiment of a computer system that may be used in connection with performing the technique described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage system 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the internet, an intranet, network or other wireless or other hardwired connection or connections by which the host systems 14a-14n may access and communicate with the data storage system 12, and may also communicate with other components (not shown) that may be included in the computer system 10. In one embodiment, the communication medium 20 may be a local area network (LAN) connection and the communication medium 18 may be an Internet Small Computer System Interface (iSCSI) or fibre channel (FC) connection.

Each of the host systems 14a-14n and the data storage system 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n, the management system 16 and data storage system may all be located at the same physical site, or, alternatively, may also be located in different physical locations. In connection with communication mediums 18 and 20, a variety of different communication protocols may be used such as, e.g., SCSI, FC, and iSCSI. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage system over an iSCSI or fibre channel connection and the management system may communicate with the data storage systems over a separate network connection using TCP/IP. It should be noted that although FIG. 1 illustrates communications between the hosts and data storage system being over a first connection, and communications between the management system and the data storage system being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

The management system 16 may be used in connection with management of the data storage system 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

An embodiment of the data storage system 12 may include one or more data storage systems. Each of the data storage systems may include one or more data storage devices, such as disks. One or more data storage systems may be manufactured by one or more different vendors. Each of the data storage systems that may be included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems.

Data storage system 12 may include a plurality of disk devices or volumes. The particular data storage system and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage system 12, and the storage system 12 may also provide data to the host systems also through the channels. The host systems do not address the disk drives of the storage system 12 directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a storage system may be accessed by multiple hosts allowing the hosts to share the data residing therein. An LV or LUN (logical unit number) may be used to refer to one of the foregoing logically defined devices or volumes.

In accordance with an embodiment of the current technique, management system 16 may provide a graphical user interface (GUI) that allows a user to visually monitor and analyze the performance of computer system 10. Generally, performance may be thought of as the amount of work accomplished by a system compared to the time and resources used. Some common terms used when measuring system performance include bandwidth, throughput, response time, availability, capacity, and recovery time.

In at least one embodiment, a GUI may present information derived from system logs that may track, for example, historical system performance pertaining to the storage system 12, the hosts 14a-14n, and the storage network as a whole. For example, the logs may be comprised of metrics data related to CPUs, memory, and I/O resources associated with one or both of storage system 12 and hosts 14a-14n, and the storage devices of storage system 12. In some embodiments, the metrics data may be collected by hardware and software located on one or more of data storage system 12, management system 16, and hosts 14a-14n. For example, at least some of the data may be obtained using a performance analysis software tool installed on management system 16 or a host (e.g., host 14a). The tool may gather necessary data stored within storage system 12 to conduct performance evaluations.

In some embodiments, management operations data may also be tracked in the system logs. Example management operations include, without limitation, configuring and provisioning storage in a data storage system for use with a particular application; backing up, moving, reorganizing, protecting, analyzing, modifying, and repairing objects stored within a data storage system; and upgrading software associated with the data storage system. The logs may also include data relating to any applications that are associated with the various management operations as well as performance metrics data collected before, during, and after execution of a management operation that may be associated with any applications, management operations, and data storage systems. Further, the system logs may also include data relating to the level of expertise, role, and permissions of users invoking and carrying out management operations.

The system logs may also track system events that may or may not be user-invoked. For example, the logs may include data pertaining to system- or application-invoked operations, a user log-in or log-out, system or application alerts, and software or hardware failures.

Depending on the embodiment, the data contained within the system logs may be used, combined, analyzed, and displayed within a GUI for visual inspection by a user. In at least one embodiment, using the system logs, management operations and events may be correlated with system performance metrics over time to enable the visual display of the management operations and events overlaying the system performance metrics data. In this embodiment, users may be able to better determine the impact of management operations and events on system performance.

Figure 2:
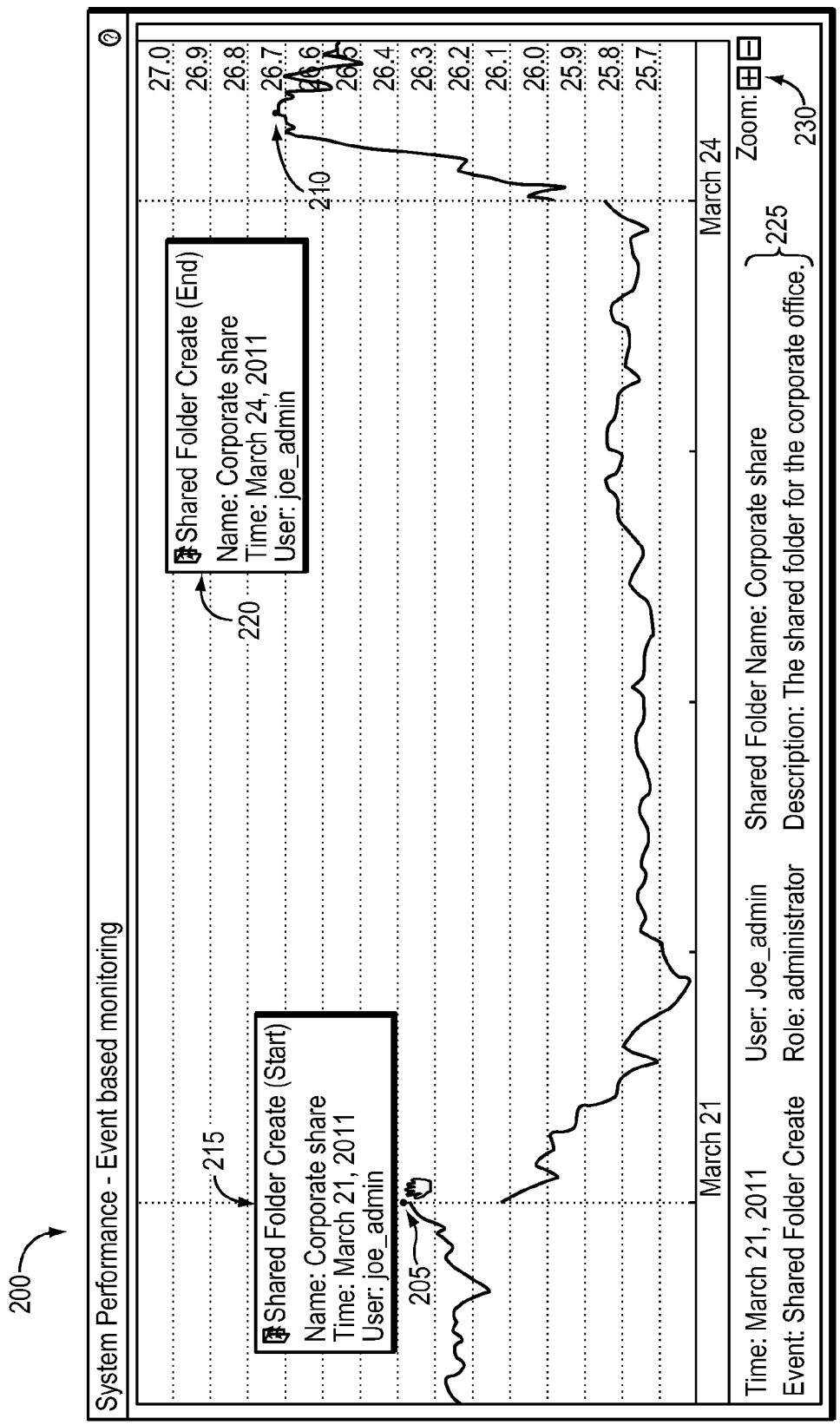
FIGS. 2 and 3 illustrate example user interfaces that may be used with the technique herein.
Figure 3:
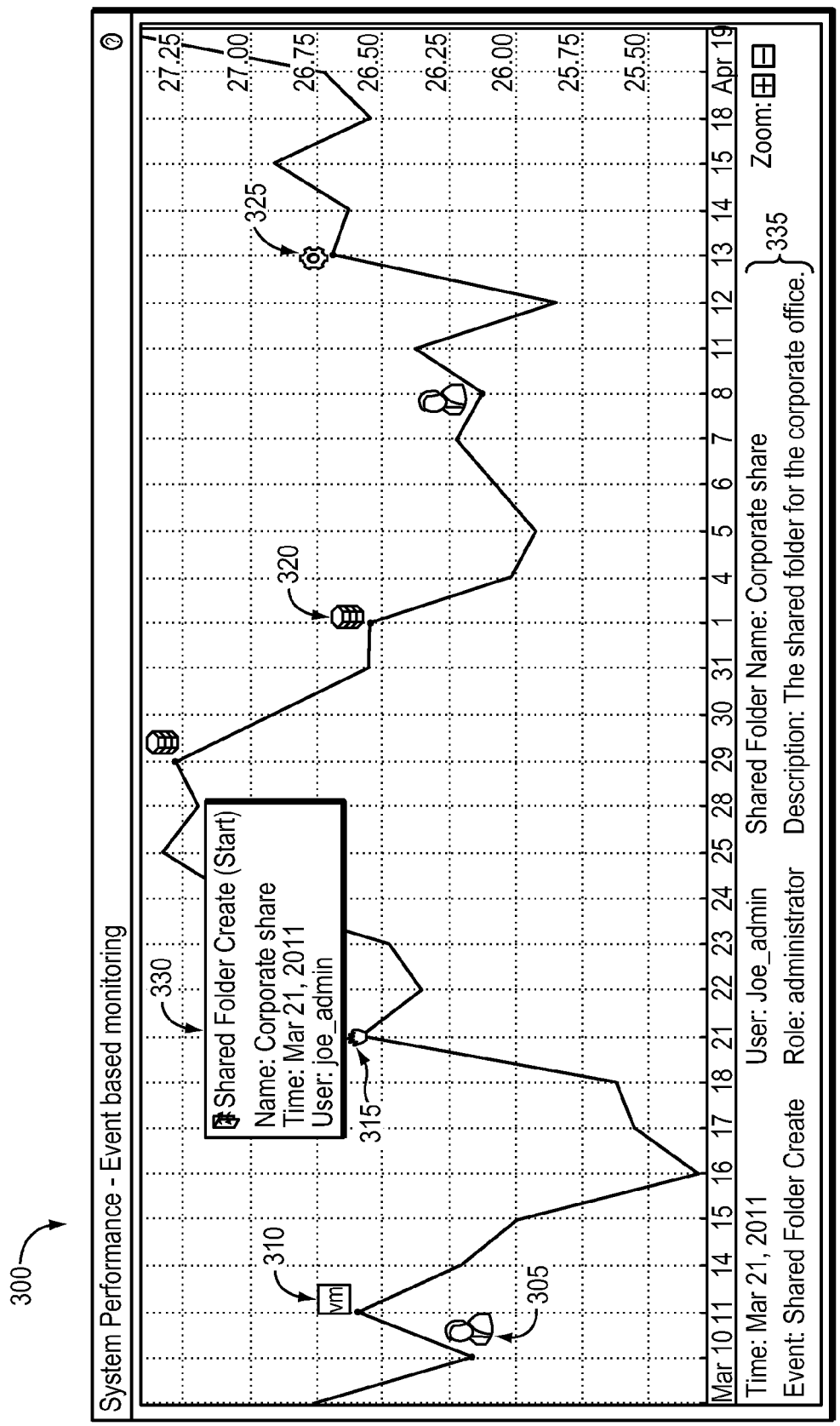

Referring now to FIG. 2 and FIG. 3, illustrated are example GUIs 200 and 300, which are in accordance with at least one embodiment of the current technique. In this embodiment, system performance is tracked over time using a line graph. The x-axis may represent time and the y-axis may represent data throughput. Different time units and different performance metrics may be used for the x- and y-axis, respectively. For example, the y-axis may represent, for example, CPU utilization, memory utilization, storage capacity, response time, or a combination of performance metrics.

In the embodiment of FIG. 2 and FIG. 3, management operations and events may be correlated with and overlay system performance metrics data. With reference to FIG. 2, each operation and event may be represented by a point on the graph. For example, point 205 indicates a point in time at which a user initiates the management operation of creating a shared folder, and point 210 indicates a point in time at which the operation completes.

The management operations and events overlaying system performance metrics data may enable a user to more easily determine how particular operations or events impact the system. For example, with an inspection of GUI 200 of FIG. 2, a user may notice that system performance declined over a period of time following the initiation of the folder creation operation, as indicated by point 205, and that system performance improved soon before the operation completed and maintained steady following completion of the operation, as can be seen by examining point 210. As a result, a user may be able to determine, for example, which user and what actions may have caused the system to perform in a particular way, which may help drive future user behavior or indicate a desirable system configuration.

In some embodiments, a user of GUI 200 may be presented with more information pertaining to a management operation or event by, for example, hovering over a point with a mouse pointer or selecting a point. For example, selecting point 205 may display pop-up window 215, which displays the name of the shared folder, the date the operation was initiated, and the user who initiated the operation. Selecting point 205 or 210 may display pop-up window 220, corresponding to the point in time at which the operation completed, as shown by point 210. Pop-up window 220 may display the same information as pop-up window 215 but may also display other information pertaining to the operation such as, for example, the time needed to complete the operation. Selecting point 205 or point 210 may also display more detailed information in area 225 such as, for example, the time the operation was initiated or completed, the user role of the user who initiated the operation, and a brief description of the operation.

It should be noted that different embodiments may provide additional features in accordance with the current technique. One such feature is the ability to zoom in on a GUI such as that illustrated in FIG. 2 to display a more detailed view or zoom out to display a less detailed view of a graph. For example, using zoom controls 230 of FIG. 2 to zoom out on GUI 200 may display an example GUI 300 as illustrated in FIG. 3. As shown, the line graph does not display graph points, but rather displays icons (e.g., icons 305, 310, 315, and 320) that may indicate the type of operation or event that occurred at a particular point in time shown on the x-axis. For example, icon 305 may indicate that a user log-in occurred on March 10, icon 310 may indicate that a virtual machine was created on March 11, icon 315 may indicate that a shared folder was created on March 21, icon 320 may indicate that a storage provisioning operation occurred on April 1, and icon 325 may indicate that a storage configuration operation occurred on April 13. It should be noted that what is displayed in a GUI, such as graph points or icons, may be based on the GUI configuration options determined, for example, upon installation of a performance analysis tool and/or selected by a user.

Using the icons in GUI 300 a user may notice that system performance declined over a period of several days following the creation of a virtual machine on March 11, as indicated by icon 310, and following a provisioning operation on April 1, as indicated by icon 320. Following the creation of a shared folder on March 21, as indicated by icon 315, a user may also notice that system performance slightly declined before improving considerably over a three or four day period.

The zoom-in feature may allow evaluation of system performance over a short time period. The zoomed-out feature may display management operations and events that have most affected system performance over a longer period. With each zoom, additional management operations and events may be added and displayed. Each added and displayed operation and event may have affected system performance less than the operations and events displayed at the previous level. The zoom feature may also display sub steps that comprise a management operation or event. In this example, a user may be able to more specifically determine what step of a management operation or event caused a particular system response.

Similar to GUI 200 of FIG. 2, hovering over or selecting an icon in GUI 300 of FIG. 3 may provide a user with further information pertaining to the management operation or event associated with the icon. For example, selecting icon 315 may display pop-up window 330, which displays the name of the created shared folder, the date it was created, and the user who created the folder. Selecting icon 315 may also display more detailed information in area 335 such as, for example, the time the folder was created, the user role of the user who created the folder, and a brief description of the operation. Icons 305, 310, 320, and 325 may similarly present information corresponding to the operation or event associated with the icons. It should be noted that the information displayed when hovering over or selecting the icon may be presented to the user in various ways depending on the embodiment. For example, the information may be presented in a new window with selectable options. For instance, a user may be given the option to cancel the operation or adjust system parameters. It should also be noted that there is no limit to the information displayed.

Other features that may be provided in one or more embodiments include:

The x-axis may represent time differently.
Other types of graphs may be used in place of or in addition to a line graph. For example, zooming to a certain level may display a bar graph indicating the number of times a particular operation or event occurred over a defined time period.
A search function may be provided. For example, a user may search by time, management operation or event, or performance level.

A user may jump to a previous or a subsequent management operation or event by a provided constant value.

Users may be limited as to what actions they can perform within a GUI or what is displayed in a GUI based on the user's level of expertise, role, or permissions.

A GUI may have a multi-colored backdrop to represent different system performance states. For example, a red backdrop spanning a number of days may represent declined system performance during those days while a green backdrop may represent improved system performance.

A user may be able to filter what is displayed. For example, only management operations or events that have affected system performance by a certain percentage may be shown, or, alternatively, only management operations that did not result in declined system performance may be shown. As another example, only a particular type of operation or event may be shown or only operations performed by a particular user. It should be noted that there are numerous options that may be given to a user to filter and configure a display. For example, a user may be given the option to display the sub steps of one or more management operations or events.

More than one graph may be shown in various arrangements. For example, four line graphs may be shown together, each graph having the same x-axis and a different y-axis (e.g., I/O performance, CPU utilization, memory utilization, overall system performance). As another example, more than one graph showing the same type of management operation or event being performed at different times may be displayed together. Alternatively, the same type of operation or event may be presented on the same graph over a specified time interval.

While the invention has been disclosed in connection with preferred embodiments shown and described in detail, their modifications and improvements thereon will become readily apparent to those skilled in the art. For example, the technique described herein may be applied to any computer system. Accordingly, the spirit and scope of the present invention should be limited only by the following claims.

What is claimed is:

1. A method, comprising:
    collecting management operations data in connection with management operations performed on a data storage system;
    collecting system events data in connection with system events performed on the data storage system;
    collecting system performance data for the data storage system;
    detecting management operations and system events that have impacted system performance of the data storage system by at least a certain amount;
    correlating the detected management operations and the detected system events data with the system performance data; and
    based on the correlation, providing a graphical user interface for enabling evaluation of the system performance by graphically displaying one or more management operations and system events overlaying system performance such that the impact of the one or more management operations and the system events on the system performance can be identified on the graphical user interface;
    wherein the graphical user interface displays one or more graphs that track system performance over a period of time, each graph comprising a first axis representing time and a second axis representing a system performance metric, each graph further comprising the one or more management operations and system events represented on the graphs by respective icons, further wherein the system performance metric on the second axis of each respective graph is different and relates to one of I/O performance, data throughput, response time, CPU utilization, memory utilization and storage capacity in connection with the data storage system;
    further wherein the graphical user interface is adapted to allow further information pertaining to the one or more management operations and system events to be, displayed when the respective icons are selected;
    further wherein the graphical user interface is adapted to allow a user to cancel a management operation or adjust system parameters of the data storage system after displaying the one or more graphs.

2. The method as claimed in claim 1, wherein the system performance data is collected before, during, and after a management operation and a system event to enable performance evaluation of the data storage system.

3. The method as claimed in claim 1, wherein the graphical user interface comprises a search capability for enabling performance evaluations of the data storage system with respect to time, management operation and system event.

4. The method as claimed in claim 1, wherein the graphical user interface is configured for enabling performance evaluations of the data storage system based on user expertise, user role and user permission.

5. The method as claimed in claim 1, wherein the management operations data for a data storage system comprises data relating to a management operation selected from the group consisting of:
    configuring and provisioning storage in the data storage system,
    backing up, moving, reorganizing, protecting, analyzing, modifying, and repairing objects stored within the data storage system,
    upgrading software associated with the data storage system,
    computer applications associated with management operations.

6. The method as claimed in claim 1, wherein the system events data comprises data relating to a system event selected from the group consisting of:
    system invoked operations,
    application invoked operations,
    a user log-in or log-out,
    system or application alerts,
    software or hardware failures.

7. A system, comprising:
    one or more processors; and
    a computer-readable medium storing instructions for execution by the one or more processors, the instructions comprising instructions to:
    collect management operations data in connection with management operations performed on a data storage system;
    collect system events data in connection with system events performed on the data storage system;
    collect system performance data for the data storage system;
    detect management operations and system events that have impacted system performance of the data storage system by at least a certain amount;

correlate the detected management operations and the detected system events data with the system performance data; and based on the correlation, provide a graphical user interface for enabling evaluation of the system performance by graphically displaying one or more management operations and system events overlaying system performance such that the impact of the one or more management operations and the system events on the system performance can be identified on the graphical user interface;

wherein the graphical user interface displays one or more graphs that track system performance over a period of time, each graph comprising a first axis representing time and a second axis representing a different system performance metric, each graph further comprising the one or more management operations and system events represented on the graphs by respective icons, further wherein the system performance metric on the second axis of each respective graph is different and relates to one of I/O performance, data throughput, response time, CPU utilization, memory utilization and storage capacity in connection with the data storage system;

further wherein the graphical user interface is adapted to allow further information pertaining to the one or more management operations and system events to be displayed when the respective icons are selected;

further wherein the graphical user interface is adapted to allow a user to cancel a management operation or adjust system parameters of the data storage system after displaying the one or more graphs.

8. The system as claimed in claim 7, wherein the system performance data is collected before, during, and after a management operation and a system event to enable performance evaluation of the data storage system.

9. The system as claimed in claim 7, wherein the graphical user interface comprises a search capability for enabling performance evaluations of the data storage system with respect to time, management operation and system event.

10. The system as claimed in claim 7, wherein the graphical user interface is configured for enabling performance evaluations of the data storage system based on user expertise, user role and user permission.

11. The system as claimed in claim 7, wherein the management operations data for a data storage system comprises data relating to a management operation selected from the group consisting of:
 configuring and provisioning storage in the data storage system,
 backing up, moving, reorganizing, protecting, analyzing, modifying, and repairing objects stored within the data storage system,
 upgrading software associated with the data storage system,
 computer applications associated with management operations.

12. The system as claimed in claim 7, wherein the system events data comprises data relating to a system event selected from the group consisting of:
 system invoked operations,
 application invoked operations,
 a user log-in or log-out,
 system or application alerts,
 software or hardware failures.

* * * * *